United States Patent Office 3,290,111

Patented Dec. 6, 1966

1

3,290,111
PROCESS FOR IMPROVING THE FASTNESS PROPERTIES OF DYEINGS

Walter Hees, Cologne-Hoechenberg, Rudolf Fingado, Leverkusen, Ernst-Robert Fritze, Cologne-Flittard, and Hellmuth Pantke, Leichlingen, Germany, assignors to Farbenfabriken Bayer Aktiengesellschaft, Leverkusen, Germany, a German corporation No Drawing. Filed Sept. 10, 1963, Ser. No. 307,793
Claims priority, application Germany, Sept. 18, 1962, F 37,828
5 Claims. (Cl. 8—74)

The present invention relates to a process for improving the fastness properties of dyeings; more particularly it concerns a process which consists in that dyeings which have been produced with acid dyestuffs on polyamide articles are after-treated with aqueous solutions of alkali metal or ammonium salts of condensation products from lower aliphatic aldehydes such as formaldehyde, or acetaldehyde, and sulphonic acids of dihydroxydiphenylsulphones. By this treatment the fastness properties, especially the wet-fastness properties, such as the fastness to water, washing and perspiration, of the dyeings can be outstandingly improved.

The molecular ratio of the starting components for the condensation products can vary within wide limits; suitable molecular ratios can be readily determined in each case by preliminary experiments. In general it is recommended to use condensation products which are produced by the action of 1–1.5 mols of sulphuric acid monohydrate per 1 mol of dihydroxydiphenylsulphone followed by reaction with 0.5–1 mol of aldehyde.

Examples of the alkali metal or ammonium salts of the condensation products, are the sodium or ammonium salts of the condensation products which are obtainable by sulphonating 4,4'-dihydroxyphenylsulphone followed by condensation of the sulphonation product with formaldehyde.

The amounts of condensation products to be used can likewise vary within wide limits, and suitable amounts can readily be determined from case to case by preliminary experiments. An amount of 1 to 2% by weight calculated on the dyed goods to be treated is generally sufficient.

By polyamide articles there are to be understood for example fibres, threads, fabrics and knitted goods of example fibres, threads, fabrics and knitted goods of ε-caprolactam, hexamethylene-diamine adipate and ω-amino-undecanoic acid.

The following examples serve to illustrate the invention without, however, limiting its scope; the parts are parts by weight.

*Example 1*

Threads produced from polymeric ε-caprolactam and dyed blue with the acid dyestuff Colour Index (2nd edition) No. 62,105, are agitated in a bath heated to 80° C. for 30 minutes at a liquor-to-goods ratio of 30:1; the bath contains 0.35 gram per litre of 85% formic acid and 1 gram of the aqueous solution described below. The filaments are then rinsed and dried. The fastness to water, washing and perspiration, of the dyed threads, are thus significantly improved.

The aqueous solution employed was produced in the following way:

70 parts of 4,4'-dihydroxydiphenylsulphone were stirred in 35 parts of acetic acid anhydride, then mixed with 35 parts of sulphuric acid monohydrate and heated at 98–100° C. for 5–6 hours. About 95% by weight of the acetic acid anhydride used was then distilled off from the reaction mixture in vacuum in the form of acetic acid, water being added several times. The reaction mixture was then mixed with 20 parts of 30% formaldehyde and heated at 105° C. for 5 hours. The aqueous solution containing the condensation product formed was then treated with a mixture of 55 parts of water and 38 parts of 50% caustic soda. The approximately 50% aqueous solution of the condensation product thus prepared had a pH value of 7.

*Example 2*

Fibres produced from polyhexamethylene-diamine adipate and dyed red with the acid dyestuff Colour Index (2nd edition) No. 17,070, are treated in the manner described in Example 1 in a bath which contains per litre 0.5 gram of glacial acetic acid and 1 gram of the aqueous solution described below. The fastness to water, washing and perspiration of the dyed fibres likewise indicates a considerable improvement.

The aqueous solution used was produced in the following way:

70 parts of a mixture 85% by weight of 4,4'-dihydroxydiphenylsulphone and about 15% by weight of 2,4'-dihypdroxydiphenylsulphone were mixed with 35 parts of sulphuric acid monohydrate in 35 parts of acetic acid anhydride. The mixture was then heated at 98–100° C. for 5–6 hours. While adding water several times about 95% by weight of the acetic acid anhydride used was distilled off from the reaction mixture in vacuum in the form of acetic acid. The reaction mixture was then treated with 20 parts of 30% formaldehyde and heated at 105° C. for 5 hours. The aqueous solution containing the condensation product formed was then treated with a mixture of 55 parts of water and 38 parts of 50% caustic soda. The approximately 50% aqueous solution of the condensation product thus prepared had a pH value of 7.

We claim:

1. A process for improving the wet fastness properties of dyeings produced with acid dyestuffs on polyamide articles inclusive of at least one of ε-caprolactam, hexamethylene diamine adipate and ω-amino undecanoic acid, comprising after-treating the dyed polyamide with an aqueous solution containing an active amount of a member selected from the group consisting of the alkali metal salt and ammonium salt of a condensation product of a lower aliphatic aldehyde and sulphonic acid of dihydroxydiphenyl sulphone.

2. The process of claim 1 wherein the condensation product is produced by contacting about 1–1.5 mols of sulfuric acid monohydrate and a mol of dihydroxy diphenyl-sulphone, and thereafter reacting with about .50–1 mol of the aliphatic aldehyde reactant.

3. The process of claim 1 wherein the aqueous treating solution contains about 1%–2% by weight of the condensation product based on the weight of polyamide article.

4. The process of claim 1 wherein acid dyed fibers of polymeric ε-caprolactam are treated in a substantially neutral aqueous bath containing, as active ingredient, the condensation product obtained by stirring about 70 parts by weight of 4,4'-dihydroxy diphenyl sulphone into about 35 parts of acetic acid anhydride and about 35 parts of sulphuric acid monohydrate, heating at about 98–100° C. for 5–6 hours, removing about 95% of the acetic acid anhydride as acid, and thereafter admixing the reaction mixture with about 20 parts of 30% formaldehyde and heating.

5. The process of claim 1 wherein acid dyed fibers of polyhexamethylene-diamine adipate are treated in a substantially neutral aqueous bath containing, as active ingredient, the condensation product obtained by stirring (A) about 70 parts by weight of a mixture of 4,4'-dihydroxydiphenyl sulphone and 2,4'-dihydroxy-diphenyl sulphone and (B) about 35 parts of sulfuric acid monohydrate in 35 parts of acetic acid anhydride; heating at about 98–100° C. for 5–6 hours, removing about 95% of the acetic acid anhydride as acid, and thereafter, admixing the reaction mixture with about 20 parts of 30% formaldehyde and heating.

References Cited by the Examiner

UNITED STATES PATENTS

| | | | |
|---|---|---|---|
| 2,163,204 | 6/1939 | Lantz et al. | 8—18 |
| 3,118,723 | 11/1964 | Harding | 8—54 X |
| 3,199,942 | 8/1965 | Kuth et al. | 8—55 |

FOREIGN PATENTS

| | | |
|---|---|---|
| 663,569 | 7/1938 | Germany. |

OTHER REFERENCES

Diserens: The Chemical Technology of Dyeing and Printing,, vol. 2, page 326, pub. by Reinhold Pub. Corp., New York, N.Y. (1951).

NORMAN G. TORCHIN, *Primary Examiner.*

J. HERBERT, *Assistant Examiner.*